United States Patent
Koh et al.

(10) Patent No.: US 10,893,578 B2
(45) Date of Patent: Jan. 12, 2021

(54) COMPOSITION FOR FORMING A HEATING ELEMENT AND METHOD OF PREPARING THE COMPOSITION

(71) Applicant: Samsung Electronics Co., Ltd., Suwon-si (KR)

(72) Inventors: Haengdeog Koh, Hwaseong-si (KR); Hajin Kim, Hwaseong-si (KR); Minjong Bae, Yongin-si (KR); Doyoon Kim, Hwaseong-si (KR); Seyun Kim, Seoul (KR); Jinhong Kim, Seoul (KR); Soichiro Mizusaki, Suwon-si (KR); Changsoo Lee, Seoul (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 0 days.

(21) Appl. No.: 16/145,753

(22) Filed: Sep. 28, 2018

(65) Prior Publication Data

US 2019/0110337 A1  Apr. 11, 2019

(30) Foreign Application Priority Data

Oct. 11, 2017 (KR) .......................... 10-2017-0131653

(51) Int. Cl.
*H05B 3/14* (2006.01)
*C08K 7/00* (2006.01)
(Continued)

(52) U.S. Cl.
CPC ............... *H05B 3/141* (2013.01); *C08K 3/40* (2013.01); *C08K 7/00* (2013.01); *C08K 9/04* (2013.01);
(Continued)

(58) Field of Classification Search
CPC ......................................................... H01B 1/14
See application file for complete search history.

(56) References Cited

U.S. PATENT DOCUMENTS 4,888,389 A * 12/1989 Kennedy ................ C08G 18/10
                                                              525/131
6,406,646 B1  6/2002 Lee et al.
(Continued)

FOREIGN PATENT DOCUMENTS

EP       0819939 A2    1/1998
JP    2011111346 A    6/2011
(Continued)

OTHER PUBLICATIONS

A. Barba et al., "Influence of the chemical composition of ceramic frits on the kinetics of their dissolution process", Journal of Ceramic Science and technology, Mar. 2016, pp. 71-78, vol. 7, Issue 1.
(Continued)

*Primary Examiner* — William D Young
(74) *Attorney, Agent, or Firm* — Cantor Colburn LLP

(57) ABSTRACT

A composition for forming a heating element; a dried and sintered product thereof; and a method of preparing the composition for forming a heating element, the composition including a matrix particle, a composite filler, and a solvent, wherein the composite filler includes a core and a coating layer disposed on the core, the core includes a nanosheet filler, and the composition has a pH in a range of about 5 to about 9.

25 Claims, 8 Drawing Sheets

(51) Int. Cl.
*C08K 3/40* (2006.01)
*C08K 9/06* (2006.01)
*H01B 1/14* (2006.01)
*C08K 9/04* (2006.01)
*C08K 3/22* (2006.01)
*C03C 8/00* (2006.01)

(52) U.S. Cl.
CPC ................ C08K 9/06 (2013.01); H01B 1/14 (2013.01); H05B 3/146 (2013.01); H05B 3/148 (2013.01); *C03C 8/00* (2013.01); *C08K 3/22* (2013.01); *C08K 2201/001* (2013.01); *C08K 2201/005* (2013.01); *C08K 2201/011* (2013.01); *H05B 2203/017* (2013.01)

(56) References Cited

U.S. PATENT DOCUMENTS

| | | | | |
|---|---|---|---|---|
| 6,476,098 | B1 * | 11/2002 | Arakawa | C08G 83/001 523/204 |
| 2007/0096617 | A1 | 5/2007 | Hwang et al. | |
| 2007/0298259 | A1 * | 12/2007 | Matsumoto | B01J 13/18 428/407 |
| 2010/0300618 | A1 * | 12/2010 | Frackmann | C08G 18/44 156/280 |
| 2011/0017719 | A1 | 1/2011 | Choi et al. | |
| 2011/0020170 | A1 | 1/2011 | Luinstra et al. | |
| 2011/0226984 | A1 | 9/2011 | Nimi et al. | |
| 2013/0192490 | A1 | 8/2013 | Buri et al. | |
| 2014/0124713 | A1 * | 5/2014 | Majumdar | H01B 1/22 252/513 |
| 2016/0254072 | A1 | 9/2016 | Park et al. | |
| 2018/0168000 | A1 | 6/2018 | Sohn et al. | |
| 2019/0371485 | A1 * | 12/2019 | Aksit | C09D 183/04 |

FOREIGN PATENT DOCUMENTS

| | | |
|---|---|---|
| JP | 2011517728 A | 6/2011 |
| JP | 2012180259 A | 9/2012 |
| JP | 2014009141 A | 1/2014 |
| KR | 20010061925 A | 7/2001 |
| KR | 20070046614 A | 5/2007 |
| KR | 1004912 B1 | 12/2010 |
| KR | 20130122290 A | 11/2013 |
| KR | 1367556 B1 | 2/2014 |
| KR | 1447478 B1 | 10/2014 |
| KR | 1525974 B1 | 6/2015 |
| KR | 1020180065886 A | 6/2018 |
| WO | 2016079501 A1 | 5/2016 |

OTHER PUBLICATIONS

Jaime Lynn George, "Dissolution of borate glasses and precipitation of phosphate compounds", Presented to the Faculty of the Graduate School of the Missouri S&T, Scholars' Mine, Student Research & Creative Works, Spring 2015, pp. 1-176.

Youngjong Kang et al., "Micelle-Encapsulated Carbon Nanotubes: A Route to Nanotube Composites", JACS Communications, Apr. 19, 2003, pp. 5650-5651, vol. 125.

* cited by examiner

COMPOSITION FOR FORMING A HEATING ELEMENT AND METHOD OF PREPARING THE COMPOSITION

CROSS-REFERENCE TO RELATED APPLICATION

This application claims priority to Korean Patent Application No. 10-2017-0131653, filed on Oct. 11, 2017, in the Korean Intellectual Property Office, and all the benefits accruing therefrom under 35 U.S.C. § 119, the content of which is incorporated herein in its entirety by reference.

BACKGROUND

1. Field

The present disclosure relates to a composition for forming a heating element, a heating element including a dried and sintered product of the composition, and a method of preparing the composition for forming a heating element.

2. Description of the Related Art

A heating element may have excellent thermal characteristics because it generates heat by using Joule heating based on a composite of a resistor and a conductor. However, the heating element may not provide uniform heating due to geometric constraints, and may exhibit poor heating efficiency. Accordingly, in order to overcome the limitations of such a heating element, a sheet-shaped heating element for heating a two-dimensional plane may be used.
Various conductive materials such as $RuO_2$ may be used in a sheet-shaped heating element. Since a conductive material may have a high percolation threshold value when it has, e.g., is in, a particle form, an excessive, e.g., large, amount of a conductive material may be required to manufacture a sheet-shaped heating element having a required electrical conductivity.

SUMMARY

Provided is a composition for forming a heating element, the composition having excellent stability over time.

Provided is a heating element which includes a dried and sintered product of the composition for a heating element.

Provided is a method of preparing a composition for a heating element.

Additional aspects will be set forth in part in the description which follows and, in part, will be apparent from the description, or may be learned by practice of the presented example embodiments.

According to an aspect, a composition for forming a heating element includes: a matrix particle; a composite filler; and a solvent, wherein the composite filler includes a core and a coating layer disposed on the core, the core includes a nanosheet filler, and the composition has a pH in a range of about 5 to about 9.

According to an aspect, a heating element includes a dried and sintered product of the composition for a heating element.

According to an aspect, a method of preparing the composition for a heating element includes: preparing a first solution having a pH in a range of about 11 or greater including a composite filler and a solvent; adding an acid to the first solution to prepare a second solution having a pH in a range of about 5 to about 9; and adding a matrix particle and a binder to the second solution and mixing the matrix particle and the binder with the second solution to prepare a composition for forming the heating element, wherein the composite filler includes a core and a coating layer disposed on the core, and the core includes a nanosheet.

BRIEF DESCRIPTION OF THE DRAWINGS

These and/or other aspects will become apparent and more readily appreciated from the following description of the example embodiments, taken in conjunction with the accompanying drawings in which.

DETAILED DESCRIPTION

Figure 1A:
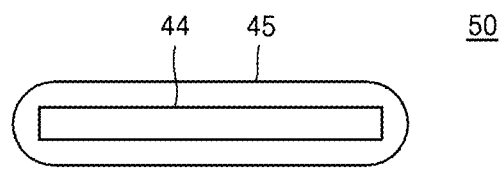
FIG. 1A is a schematic cross-sectional view of a composite filler, in which a first polymer layer is disposed on a nanosheet filler, according to an example embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

The terminology used herein is for the purpose of describing particular embodiments only and is not intended to be limiting. As used herein, the singular forms "a," "an," and "the" are intended to include the plural forms, including "at least one," unless the context clearly indicates otherwise. "At least one" is not to be construed as limiting to "a" or "an". "Or" means "and/or". As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Sizes and thicknesses of components in the drawings may be reduced or exaggerated for convenience of explanation. As used herein, when a layer, region, or component is referred to as being "formed on," another layer, region, or component, it can be directly or indirectly formed on the other layer, region, or component. Although the terms first, second, etc. may be used herein to describe various elements, these elements should not be limited by these terms. These terms are only used to distinguish one element from another.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, or 5% of the stated value. All ranges are inclusive of the endpoint.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

A conductive material having a two-dimensional nanostructure may have a low percolation threshold value, and a sheet-shaped heating element having desired electrical conductivity even with a low content of the conductive material may be manufactured. The sheet-shaped heating element may be manufactured by coating a substrate with a composition for forming a heating element, the composition including a conductive material, and an insulating material. A composition for forming the heating element may include the conductive material having a two-dimensional nanostructure and an insulating material, and the conductive material and the insulating material may be homogeneously and stably dispersed in the composition.

Hereinafter, a composition for a heating element, a heating element including a dried and sintered product of the composition, and a method of preparing a composition for a heating element according to example embodiments will be described in more detail.

A composition for forming a heating element includes: a matrix particle; a composite filler; and a solvent. The composite filler includes: a core; and a coating layer disposed on the core. The core includes a nanosheet. The composition for forming a heating element has a pH of about 5 to about 9.

The composition for forming a heating element can be stably dispersed in a solution have an acidic, neutral or basic pH by including a composite filler including a nanosheet filler coated with a coating layer. Therefore, even after the composition for forming a heating element is stored at room temperature for a long time, the reduction in electrical conductivity of a heating element obtained by drying and sintering the composition for forming a heating element can be suppressed. For example, it may not be possible to manufacture a heating element using a composition having a basic pH of about 12 or greater, because a nanosheet filler may be precipitated after the composition is stored at room temperature for 48 hours. The pH of the composition for forming a heating element may be about 5 to about 9, about 5 to about 8.5, about 5.5 to about 8.5, about 5.5 to about 8, about 6 to about 8, about 6.5 to about 8, or about 6.5 to about 7.5. The dispersion stability of the composition for forming a heating element can be further improved in such a pH range.

The coating layer included in the composite filler may coat a part or whole, e.g., an entirety, of the nanosheet filler. For example, the coating layer may completely coat the nanosheet filler. Since the coating layer coats a part or whole of the nanosheet filler, the change in dispersibility of the nanosheet filler according to the pH of the composition can be suppressed. The nanosheet filler refers to a filler having a nanosheet shape. The nanosheet refers to a two-dimensional (2D) nanostructure. The two-dimensional nanostructure refers to a structure having a nanometer-scale size, in which the size, e.g., length of any one dimension, e.g., direction, is significantly smaller than the size of the other two dimensions. For example, a filler having a two-dimensional nanostructure, that is, a nanosheet filler, may have a size of about 1,000 nanometers (nm) or less in a first direction (in a thickness direction), a size of about 1 micrometers (μm) or more in a second direction perpendicular to the first direction, and a size of about 1 μm or more in a third direction perpendicular to the second direction, e.g., perpendicular to the second direction and the first direction. The term "sheet" refers to a structure having a length in any one direction that is significantly smaller than the length of the other two dimensions of the structure.

The coating layer may be a polymer layer including one or more polymers. The coating layer may be a polymer coating layer disposed directly on the nanosheet filler. For example, the coating layer may be a polymer coating layer including a first polymer layer disposed on the nanosheet filler. For example, the coating layer may be a polymer coating layer having a bilayer structure including a first polymer layer directly disposed on the nanosheet filler and a second polymer layer contacting the first polymer layer and disposed on the first polymer layer. For example, the coating layer may be a polymer coating layer having a multilayer structure including a first polymer layer disposed on the nanosheet filler, a second polymer layer contacting the first polymer layer and disposed on the first polymer layer, and a third polymer layer contacting the second polymer layer and disposed on the second polymer layer. For example, the coating layer may be a polymer coating layer having a multilayer structure including a first polymer layer disposed on the nanosheet filler, a second polymer layer contacting the first polymer layer and disposed on the first polymer layer, a third polymer layer contacting the second polymer layer and disposed on the second polymer layer, and a fourth polymer layer contacting the third polymer layer and disposed on the third polymer layer. Since the first polymer layer and the second polymer layer are strongly bonded by Van der Waals force and/or hydrogen bonding, the polymer coating layer can have improved mechanical strength and mechanical stability.

The coating layer may include a polymer ionically charged so as to have a positive charge or a negative charge. Such polymers may be cationic, anionic, or zwitterionic, provided that the polymer overall has a net positive or negative charge. For example, the coating layer may be a polymer coating layer including a first polymer layer disposed on the nanosheet filler and ionically charged so as to have a positive charge or a negative charge. For example, the coating layer may be a polymer coating layer having a bilayer structure including a first polymer layer directly disposed on the nanosheet filler and ionically charged and a second polymer layer contacting the first polymer layer and disposed on the first polymer layer and ionically charged so as to have a charge opposite to the charge of the first polymer layer. For example, the coating layer may be a polymer coating layer having a multilayer structure including a first polymer layer directly disposed on the nanosheet filler and ionically charged, a second polymer layer contacting the first polymer layer and disposed on the first polymer layer and ionically charged so as to have a charge opposite to the charge of the first polymer layer, and a third polymer layer contacting the second polymer layer and disposed on the second polymer layer and ionically charged so as to have a charge opposite to the charge of the second polymer layer and have a charge the same as the charge of the first polymer layer. For example, the coating layer may be a polymer coating layer having a multilayer structure including a first polymer layer directly disposed on the nanosheet filler and ionically charged, a second polymer layer contacting the first polymer layer and disposed on the first polymer layer and ionically charged so as to have a charge opposite to the charge of the first polymer layer, a third polymer layer contacting the second polymer layer and disposed on the second polymer layer and ionically charged so as to have a charge opposite to the charge of the second polymer layer and have a charge the same as the charge of the first polymer layer, and fourth polymer layer contacting the third polymer layer and disposed on the third polymer layer and ionically charged so as to have a charge opposite to the charge of the third polymer layer and have a charge the same as the charge of the second polymer layer. Since the first polymer layer and the second polymer layer are strongly bonded by Van der Waals force and/or hydrogen bonding, the polymer coating layer can have improved mechanical strength and mechanical stability.

Figure 1B:
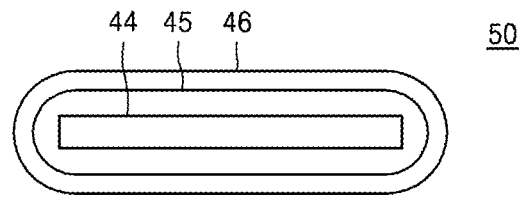
FIG. 1B is a schematic cross-sectional view of a composite filler, in which a first polymer layer and a second polymer sheet are sequentially disposed on a nanosheet filler, according to an example embodiment.
Figure 1C:
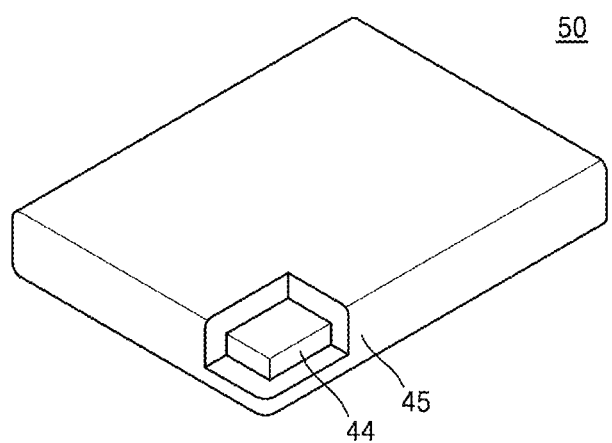
FIG. 1C is a schematic partial cross-sectional view of a composite filler, in which a first polymer layer is disposed on a nanosheet filler, according to an example embodiment.
Figure 1D:
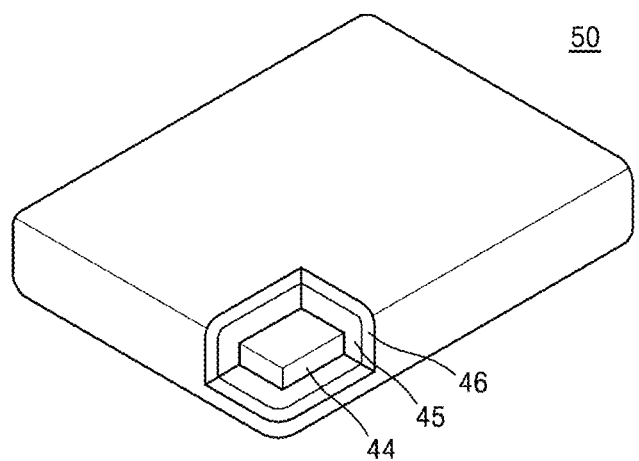
FIG. 1D is a schematic partial cross-sectional view of a composite filler, in which a first polymer layer and a second polymer sheet are sequentially disposed on a nanosheet filler, according to an example embodiment.

Referring to FIGS. 1A and 1C, a composite filler 50 may include a nanosheet filler 44 and a first polymer layer 45 disposed on the nanosheet filler 44. Referring to FIGS. 1B and 1D, a composite filler 50 may include a nanosheet filler 44, a first polymer layer 45 disposed on the nanosheet filler 44, and a second polymer layer 46 disposed on the first polymer layer 45. Each of the first polymer layer 45 and the second polymer layer 46 may be a mixed polymer layer including one polymer or two or more polymers.

The coating layer may include an amphiphilic polymer. The amphiphilic polymer includes a polymer including a functional group or a repeating unit having affinity for a plurality of solvents having different polarities. The amphiphilic polymer can be disposed at a solid/liquid interface and a liquid/liquid interface. For example, the amphiphilic polymer may be disposed at a solid/liquid interface to have affinity with a liquid while coating a solid surface, so that dispersion stability can be improved, thereby not allowing a precipitation of a solid in a liquid. The amphiphilic polymer may include a first moiety having a high affinity with a first medium and a second moiety having a high affinity with a second medium. The first moiety and the second moiety may be one or more one or more different types of moieties. For example, the amphiphilic polymer may have a structure of first moiety-second moiety, e.g., including one first moiety and one second moiety, a structure of first moiety-second moiety-first moiety, e.g., including two first moieties and one second moiety, or a structure of second moiety-first moiety-second moiety e.g., including one first moieties and two second moieties. The first moiety and the second moiety may each independently be a cationic moiety, an anionic moiety, or a nonionic moiety. For example, the amphiphilic polymer may have a structure of nonionic moiety-anionic moiety, e.g., including a nonionic moiety and an anionic moiety, a structure of nonionic moiety-cationic moiety, e.g., including a nonionic moiety and a cationic moiety, a structure of nonionic moiety-nonionic moiety, e.g., including two nonionic moieties, or a structure of nonionic moiety-nonionic moiety-nonionic moiety e.g., including three nonionic moieties. The first moiety and the second moiety may each independently be a hydrophilic moiety or a hydrophobic moiety. For example, the amphiphilic polymer may have a structure of hydrophilic moiety-hydrophobic moiety, e.g., including a hydrophilic moiety and a hydrophobic moiety, a structure of hydrophobic moiety-hydrophilic moiety-hydrophobic moiety, e.g., including two hydrophobic moieties and a hydrophilic moiety, or a structure of hydrophilic moiety-hydrophobic moiety-hydrophilic moiety e.g., including two hydrophilic moieties and a hydrophobic moiety.

For example, the coating layer may include polyethylenimine (PEI), polyethylene oxide-b-polypropylene oxide-b-polyethylene oxide (PEO-b-PPO-b-PEO), polyvinylamine (PVAm), polyethylene oxide-b-polyacrylic acid (PEO-b-PAA), polyethylene oxide-b-polymethacrylic acid (PEO-b-PMAA), polyethylene oxide-b-polyethyleneimine (PEO-b-PEI), polyethylene oxide-b-polyaspartic acid (PEG-b-PASP), polydimethylaminoethyl methacrylate-b-polydihydropropyl methacrylate (PDMAEMA-b-PHMA), polyacrylic acid-b-polyacrylamide (PAA-b-PAM), polyacrylic acid-b-polyhydroxyethyl acrylate (PAA-b-PHEA), polyethyleneamine (PEA), polyethylene oxide (PEO), polyethylene glycol (PEG), polyethylene sulfone (PES), or a combination thereof. However, examples of the polymers are not limited thereto, and any suitable polymer can be used as long as it can improve the dispersibility of the composite filler in the art.

For example, the coating layer may include a first polymer and a second polymer, and the weight ratio of the first polymer and the second polymer may be 10:90 to 90:10, 20:80 to 80:20, 30:70 to 70:30, or 40:60 to 60:40. The dispersibility of the composite filler can be further improved by having such a content ratio of the first polymer and the second polymer.

The content of the polymer in the coating layer may be 10 to 500 parts by weight, 20 to 450 parts by weight, 30 to 400 parts by weight, 40 to 350 parts by weight, 50 to 300 parts by weight, 60 to 250 parts by weight, 70 to 200 parts by weight, 80 to 150 parts by weight, or 80 to 120 parts by weight, based on 100 parts by weight of the nanosheet filler. When the content of the polymer is too small, the dispersion stability of the composite filler may deteriorate. When the content of the polymer is too large, the amount of the polymer to be thermally decomposed at the time of sintering may be excessively, e.g., relatively, large, and thus sinterability may deteriorate.

The thermal decomposition temperature of the polymer included in the coating layer may be 700° C. or lower, 600° C. or lower, 500° C. or lower, 400° C. or lower, or 300° C. or lower. The polymer included in the coating layer is thermally decomposed at the time of sintering the composition for forming a heating element, and does not remain in the heating element obtained after the sintering.

The nanosheet filler may include an oxide, a boride, a carbide, a chalcogenide, or a combination thereof.

Examples of the oxide used for the nanosheet filler may include indium tin oxide (ITO), $RuO_{(2+x)}$ ($0 \leq x \leq 0.1$), $MnO_2$, $ReO_2$, $VO_2$, $OsO_2$, $TaO_2$, $IrO_2$, $NbO_2$, $WO_2$, $GaO_2$, $MoO_2$, $InO_2$, $CrO_2$, and $RhO_2$.

Examples of the boride used for the nanosheet filler may include $Ta_3B_4$, $Nb_3B_4$, $TaB$, $NbB$, $V_3B_4$, and $VB$.

Examples of the carbide used for the nanosheet filler may include $Dy_2C$ and $Ho_2C$.

Examples of the chalcogenide used for the nanosheet filler may include $AuTe_2$, $PdTe_2$, $PtTe_2$, $YTe_3$, $CuTe_2$, $NiTe_2$, $IrTe_2$, $PrTe_3$, $NdTe_3$, $SmTe_3$, $GdTe_3$, $TbTe_3$, $DyTe_3$, $HoTe_3$, $ErTe_3$, $CeTe_3$, $LaTe_3$, $TiSe_2$, $TiTe_2$, $ZrTe_2$, $HfTe_2$, $TaSe_2$, $TaTe_2$, $TiS_2$, $NbS_2$, $TaS_2$, $Hf_3Te_2$, $VSe_2$, $VTe_2$, $NbTe_2$, $LaTe_2$, and $CeTe_2$.

The thickness of the nanosheet filler may be 1 nm to 1,000 nm, 1 nm to 900 nm, 1 nm to 800 nm, 1 nm to 700 nm, 1 nm to 600 nm, 1 nm to 500 nm, 1 nm to 400 nm, 1 nm to 300 nm, 1 nm to 200 nm, 1 nm to 100 nm, 1 nm to 80 nm, 1 nm to 60 nm, 1 nm to 40 nm, 1 nm to 20 nm, or 1 nm to 10 nm. When the thickness of the nanosheet filler is too small, the nanosheet fillers may undesirably aggregate, e.g., with each other. When the thickness of the nanosheet filler is too large, the physical properties of the nanosheet filler may be similar to those of a known filler.

The length of the nanosheet filler may be 0.1 µm to 500 µm, 0.1 µm to 400 µm, 0.1 µm to 300 µm, 0.1 µm to 200 µm, 0.1 µm to 100 µm, 0.1 µm to 80 µm, 0.1 µm to 60 µm, 0.1 µm to 40 µm, 0.1 µm to 20 µm, 0.1 µm to 10 µm, 0.1 µm to 8 µm, 0.1 µm to 6 µm, 0.1 µm to 4 µm, or 0.1 µm to 2 µm. When the length of the nanosheet filler is too small, it may be difficult for the nanosheet filler to have a nanosheet structure. When the length of the nanosheet filler is too large, the physical properties of the nanosheet filler may be similar to those of a known filler. The length of the nanosheet filler refers to the maximum distance between both, e.g., opposite, ends of the nanosheet filler.

The content of the nanosheet filler in the composition for forming a heating element may be about 99% by volume (vol %) or less, about 80% by volume or less, about 60% by volume or less, about 50% by volume or less, about 40% by volume or less, about 30% by volume or less, about 20% by volume or less, 0.1% by volume to about 20% by volume, 0.1% by volume to about 18% by volume, 0.1% by volume to about 16% by volume, 0.1% by volume to about 14% by volume, 0.1% by volume to about 12% by volume, 0.1% by volume to about 10% by volume, 0.1% by volume to about 8% by volume, 0.1% by volume to about 6% by volume, 0.1% by volume to about 5% by volume, 0.1% by volume to about 4% by volume, 0.1% by volume to about 3% by volume, 0.1% by volume to about 2% by volume, or 0.1% by volume to about 1% by volume, based on the total volume of the matrix particle and the nanosheet filler.

The electrical conductivity of the nanosheet filler may be about 1000 siemens per meter (S/m) or more, about 1100 S/m or more, about 1200 S/m or more, or about 1250 S/m or more.

Some of the materials which can be used for the nanosheet filler and which have an electrical conductivity of more than 1000 S/m are shown in Tables 1 to 3 below. Table 1 shows oxide filler materials, Table 2 shows boride and carbide filler materials, and Table 3 shows chalcogenide filler materials.

TABLE 1

| Composition | S/m | Composition | S/m |
|---|---|---|---|
| $RuO_2$ | $3.55 \times 10^6$ | $NbO_2$ | $3.82 \times 10^6$ |
| $MnO_2$ | $1.95 \times 10^6$ | $WO_2$ | $5.32 \times 10^6$ |
| $ReO_2$ | $1.00 \times 10^7$ | $GaO_2$ | $2.11 \times 10^6$ |
| $VO_2$ | $3.07 \times 10^6$ | $MoO_2$ | $4.42 \times 10^6$ |
| $OsO_2$ | $6.70 \times 10^6$ | $InO_2$ | $2.24 \times 10^6$ |
| $TaO_2$ | $4.85 \times 10^6$ | $CrO_2$ | $1.51 \times 10^6$ |
| $IrO_2$ | $3.85 \times 10^6$ | $RhO_2$ | $3.10 \times 10^6$ |

TABLE 2

| Class | Composition | σ (S/m) |
|---|---|---|
| Boride | $Ta_3B_4$ | 2,335,000 |
|  | $Nb_3B_4$ | 3,402,000 |
|  | $TaB$ | 1,528,800 |
|  | $NbB$ | 5,425,100 |
|  | $V_3B_4$ | 2,495,900 |
|  | $VB$ | 3,183,200 |
| Carbide | $Dy_2C$ | 180,000 |
|  | $Ho_2C$ | 72,000 |

TABLE 3

| Composition | σ (S/m) | Composition | σ (S/m) |
|---|---|---|---|
| $AuTe_2$ | 433,000 | $TiSe_2$ | 114.200 |
| $PdTe_2$ | 3,436,700 | $TiTe_2$ | 1.055.600 |
| $PtTe_2$ | 2,098,000 | $ZrTe_2$ | 350.500 |
| $YTe_3$ | 985,100 | $HfTe_2$ | 268.500 |
| $CuTe_2$ | 523,300 | $TaSe_2$ | 299.900 |
| $NiTe_2$ | 2,353,500 | $TaTe_2$ | 444.700 |
| $IrTe_2$ | 1,386,200 | $TiS_2$ | 72.300 |
| $PrTe_3$ | 669,000 | $NbS_2$ | 159.100 |
| $NdTe_3$ | 680,400 | $TaS_2$ | 81.000 |
| $SmTe_3$ | 917,900 | $Hf_3Te_2$ | 962.400 |
| $GdTe_3$ | 731,700 | $VSe_2$ | 364.100 |
| $TbTe_3$ | 350,000 | $VTe_2$ | 238.000 |
| $DyTe_3$ | 844,700 | $NbTe_2$ | 600.200 |
| $HoTe_3$ | 842,000 | $LaTe_2$ | 116.000 |
| $ErTe_3$ | 980,100 | $LaTe_3$ | 354.600 |
| $CeTe_3$ | 729,800 | $CeTe_2$ | 55.200 |

The dispersibility of the composite filler in the composition for forming a heating element may be independent of the pH of the composition. That is, the dispersibility of the composite filler may be stably maintained regardless of the composition. For example, the dispersibility of the composite filler may be stable at a pH in a range of about 1 to about 14, pH about 2 to about 13, pH about 3 to about 12, pH about 4 to about 11, pH about 5 to about 10, pH about 5 to about 9, pH about 5 to about 8, or pH about 6 to about 8. That is, even when the composition for forming a heating element having a pH within such a range and including the composite filler is left at room temperature for about 48 hours or more, about 72 hours or more, or about 100 hours or more, the composite filler may not be precipitated from, e.g., may not precipitate from, the composition for forming a heating element. For example, even when the composition for forming a heating element having a pH of about 5 to about 8 and including the composite filler is left at room temperature for about 48 hours or more, about 72 hours or more, or about 100 hours or more, the composite filler may not be precipitated from the composition for forming a heating element.

The matrix particle may include a ceramic particle. The matrix particle may include a glass frit as a ceramic particle. For example, the glass frit may include silicon oxide, lithium oxide, nickel oxide, cobalt oxide, boron oxide, potassium oxide, aluminum oxide, titanium oxide, manganese oxide, copper oxide, zirconium oxide, phosphorus oxide, zinc oxide, bismuth oxide, lead oxide, sodium oxide, or a combination thereof. The glass frit may be one in which an additive is added to the silicon oxide. The additive may include lithium (Li), nickel (Ni), cobalt (Co), boron (B), potassium (K), aluminum (Al), titanium (Ti), manganese (Mn), copper (Cu), zirconium (Zr), phosphorus (P), zinc (Zn), bismuth (Bi), lead (Pb), sodium (Na), or a combination thereof. The additive is not limited to the aforementioned elements. The glass frit may include enamel. For example, the glass frit may include zinc oxide-silicon oxide ($ZnO$—$SiO_2$) glass frit, zinc oxide-boron oxide-silicon oxide ($ZnO$—$B_2O_3$—$SiO_2$) glass frit, zinc oxide-boron oxide-silicon oxide-aluminum oxide ($ZnO$—$B_2O_3$—$SiO_2$—$Al_2O_3$) glass frit, bismuth oxide-silicon oxide ($Bi_2O_3$—$SiO_2$) glass frit, bismuth oxide-boron oxide-silicon oxide ($Bi_2O_3$—$B_2O_3$—$SiO_2$) glass frit, bismuth oxide-boron oxide-silicon oxide-aluminum oxide ($Bi_2O_3$—$B_2O_3$—$SiO_2$—$Al_2O_3$) glass frit, bismuth oxide-zinc oxide-boron oxide-silicon oxide ($Bi_2O_3$—$ZnO$—$B_2O_3$—$SiO_2$) glass frit, bismuth oxide-zinc oxide-boron oxide-silicon oxide-aluminum oxide ($Bi_2O_3$—$ZnO$—$B_2O_3$—$SiO_2$—$Al_2O_3$) glass frit, or a combination thereof.

The matrix particle may include an organic particle having heat resistance. For example, the matrix particle may include an organic polymer particle. The organic polymer may have a melting temperature Tm of, for example, 200° C. or higher. The organic polymer may have a glass transition temperature Tg of, for example, 100° C. or higher. For example, the organic polymer may be, but is not limited to, polysiloxane (PS), polyimide (PI), polyphenylenesulfide (PPS), polybutylene terephthalate (PBT), polyamideimide (PAI), liquid crystalline polymer (LCP), polyethylene terephthalate (PET), and polyetheretherketone (PEEK), or a combination thereof. Any suitable organic polymer is not limited as long as it can be used as the matrix material of a heating element.

The particle diameter of the matrix particle may be about 1 μm to about 50 μm, about 1.5 μm to about 45 μm, about 2 μm to about 40 μm, about 2.5 μm to about 35 μm, about 3 μm to about 30 μm, about 3.5 μm to about 25 μm, about 4 μm to about 20 μm, or about 5 μm to about 20 μm. The dispersion stability of the matrix particles in the composition for forming a heating element can be improved because the matrix particle has a particle diameter within such a range. When the particle diameter of the matrix particle is too small, the surface area of the matrix particle may increase, and thus the dispersion stability of the matrix particles may deteriorate. When the particle size of the matrix particle is too large, the weight of the matrix particle may increase, and thus the dispersion of the matrix particles may be difficult.

The matrix particle may be an ionically charged matrix particle further including a coating layer disposed on the surface of the matrix particle and ionically charged so as to have a positive charge or a negative charge. Since the ionically charged matrix particles have the same charges as each other, the ionically charged matrix particles have electrostatic repulsive force with each other impeding aggregation with each other, and the ionically charged matrix particles can be stably dispersed in the composition for forming a heating element. Further, when the composite filler is ionically charged so as to have the same charge as the matrix particle, the composite filler and the ionically charged matrix particle have the same charge as each other, and thus the composite filler and the ionically charged matrix particle have electrostatic repulsive force with each other impeding aggregation with each other, and the composite filler and the ionically charged matrix particle can be stably dispersed in the composition for forming a heating element.

For example, the coating layer of the matrix particle may be ionically charged to have a negative charge. The coating layer of the matrix particle, ionically charged to have a negative charge, may include, but is not limited to, hydroxide ion ($OH^-$), sulfate ion ($SO_4^{2-}$), sulfite ion ($SO_2^{2-}$), nitrate ion ($NO_3^-$), acetate ion ($CH_3COO^-$), permanganate ion ($MnO_4^-$), carbonate ion ($CO_3^{2-}$), sulfide ion ($S_2^-$), chloride ion ($Cl^-$), bromide ion ($Br^-$), fluoride ion ($F^-$), oxide ion ($O^{2-}$), $COO^-$ ion, cyanate ion ($OCN^-$), tosylate ion (p-toluenesulfonic acid ion ($CH_3C_6H_4SO_3^-$)), or a combination thereof. For example, the coating layer may include a carboxylate ion (including a higher fatty acid alkali ion, an N-acryl amino acid ion, and a alkyl ether carboxylic acid ion), a sulfonyl ion (including an alkyl sulfonic acid ion, an alkylbenzene ion, an alkyl amino acid ion, and an alkyl naphthalene sulfonic acid ion), a sulfate ester ion (including an alkyl sulfate ion, an alkyl ether sulfate ion, an alkyl aryl ether sulfate ion, and an alkylamide sulfate ion), and a phosphate ester ion (including an alkyl phosphate ion, an alkyl ether phosphate ion, and an alkyl aryl ether phosphate ion). Any of the foregoing alkyl groups may be the same or different, and may be a C1 to C36 alkyl group.

In contrast, the coating layer of the matrix particle may be ionically charged to have a positive charge. The coating layer of the matrix particle, ionically charged to have a positive charge, may include a cation such as an ammonium ion ($-NH_3^+$). For example, the coating layer may include an aliphatic or aromatic amine ion that includes a primary, secondary, or tertiary amine, or a combination thereof, wherein the aliphatic or aromatic groups may be the same or different and have 1 to 18 carbon atoms, and optionally the nitrogen of the amine may be a ring member. The cation may be a so-called onium compound such as a quaternary ammonium ion, a phosphonium ion, or a sulfonium ion, optionally substituted with aliphatic or aromatic groups that may be the same or different and have 1 to 18 carbon atoms, and optionally the nitrogen, phosphorus, or sulfur may be a ring member. Specifically, the coating layer may include an amine ion, preferably an alkylammonium, an aromatic ammonium, or a heterocyclic ammonium ion.

The ionically charged matrix particle may be prepared by treatment the matrix particle using an ion-containing precursor solution capable of forming the ionically charged coating layer so as to have a positive charge or a negative charge. For example, the matrix particle whose surface is ionically charged with a hydroxide ion may be obtained by treating a matrix particle with a strong acid such as an RCA solution and dispersing the matrix particle in water. The RCA solution is a mixed solution of water ($H_2O$)/hydrogen peroxide ($H_2O_2$)/ammonia water ($NH_4OH$). A hydrophilic functional group (OH—) may be introduced into the surface of the matrix particle by using an oxidant such as an RCA solution. The matrix particle whose surface is ionically charged with a hydrophilic group such as $OH^-$ can be stably dispersed in the composition for forming a heating element.

Whether to introduce an ionically charged coating layer with a positive charge or an ionically charged coating layer with a negative charge can be determined according to the surface charge characteristics of the composite filler. For example, when the matrix particle is mixed with the composite filler including the ionically charged coating layer with a negative charge, the ionically charged coating layer with a negative charge is introduced into the surface of the matrix particle, thereby improving the dispersion stability of the matrix particles in the composition for forming a heating element.

For example, the coating layer of the matrix particle may include a hydrolysate of organosilane, an amphiphilic polymer, or a combination thereof. The organosilane may include ammonium silane monomolecular compounds, and ammonium silane oligomers. For example, the organosilane may include N-2-(aminoethyl)-3-aminopropylmethyldimethoxysilane, N-2-(aminoethyl)-3-aminopropyltrimethoxysilane, 3-aminopropyltrimethoxysilane, 3-aminopropyltriethoxysilane, N-phenyl-3-aminopropyltrimethoxysilane, or a combination thereof. The amphiphilic polymer may include one of the aforementioned amphiphilic polymers used for the coating layer of the composite filler.

The composition for forming a heating element may further include a suitable additive such as a dispersion stabilizer, an oxidation stabilizer, a weather stabilizer, an antistatic agent, a dye, a pigment, a coupling agent, or a combination thereof within a range not impairing, e.g., negatively affecting, a heating effect of the heating element.

The dispersion stabilizer imparts dispersion stability and orientation to the composite filler, thereby minimizing or preventing aggregation between the composite fillers and increasing dispersibility of the composite fillers. Thus, it may be possible to improve percolation of the nanosheet fillers and to improve the conductivity and heating characteristics of the manufactured heating element. Examples of the dispersion stabilizer may include an amine monomer, an amine oligomer, an amine polymer, and a combination thereof. For example, the dispersion stabilizer may include tetrabutyl ammonium hydroxide (TBAOH) tetramethyl ammonium hydroxide (TMAOH), or a combination thereof.

The surface of the nanosheet filler is capped with such a dispersion stabilizer, thereby minimizing or preventing the aggregation of the composite fillers and increasing the dispersibility of the composite fillers.

The composition for forming a heating element may further include a binder. The binder can improve the dispersibility of conductive inorganic fillers and the viscosity of the composition, thereby improving the coatability, heating characteristics and film quality of a heating element.

For example, the binder may include a cellulose polymer, an acrylic polymer, a styrene polymer, a polyvinyl resin, a methacrylic acid ester polymer, a styrene-acrylic acid ester copolymer, a polystyrene, a polyvinyl butyral, a polyvinyl alcohol, a polyethylene oxide, a polyacrylonitrile, a polypropylene carbonate, a polymethyl methacrylate, an ammonium acrylate polymer, an arabic gum, a gelatin, an alkyd resin, a butyral resin, a saturated polyester resin, a natural rubber, a silicone rubber, a fluorosilicone, a fluoroelastomer, a synthetic rubber, copolymers thereof, or a combination thereof. For example, when the cellulose polymer is used as the binder, the viscosity of the composition for forming a heating element can be controlled, and the coatability and heating characteristics of the heating element can be improved.

A functionalized matrix particle, a conductive inorganic filler and optionally an additive such as a dispersion stabilizer are mixed in a solvent to prepare a composition solution, and then the binder may be added to the composition solution. The composition for forming a heating element preferably has an appropriate range of viscosity capable of spraying without clogging a nozzle of e.g., a sprayer, and the viscosity range thereof is not particularly limited.

The composition for forming a heating element includes a solvent capable of dispersing the matrix particles and the composite filler. As the solvent, water or a mixture of water and an organic solvent miscible with water at room temperature (water-miscible organic solvent) may be used. For example, the content of water in the solvent may be 90% by weight (wt %) or more, 95 wt %, or substantially, e.g., about, 100 wt %. Examples of the organic solvent miscible with water at room temperature may include monoalcohols having 2 to 6 carbon atoms (for example, ethanol, isopropanol, and the like); polyols having 2 to 20 carbon atoms, specifically 2 to 10 carbon atoms, and more specifically 2 to 6 carbon atoms (for example, glycerol, propylene glycol, butylene glycol, pentylene glycol, hexylene glycol, dipropylene glycol, and diethylene glycol); glycol ethers and, particularly glycol ethers having 3 to 16 carbon atoms (for example, C1-C4 alkyl ether of mono-, di- or tripropylene glycol, and C1-C4 alkyl ether of mono-, di- or triethylene glycol); and mixtures thereof. The solvent functions to control the viscosity of the composition for forming a heating element such that a heating element can be manufactured. The content of the solvent is not particularly limited, and the solvent may be in an amount of several hundred times as much as the weight of the matrix particles. For example, the content of the solvent may be about 5 to about 50,000 parts by weight, about 10 to about 2,000 parts by weight, about 20 to about 1,000 parts by weight, or about 25 to about 500 parts by weight, based on 100 parts by weight of the matrix particles.

In the composition for forming a heating element, the electrical conductivity of a second heating element obtained by using a second composition prepared by leaving the composition at room temperature for about 100 hours after the preparation thereof may be about 70% or more, about 75% or more, about 80% or more, about 85% or more, about 90% or more, about 95% or more, about 96% or more, about 97% or more, about 98% or more, or about 99% or more of the electrical conductivity of a first heating element obtained by using a first composition prepared by leaving the composition at room temperature for 0 hours after the preparation thereof. Since the composition for forming a heating element is neutral and includes the composite filler provided on the surface thereof with the coating layer, the change in electrical conductivity of the heating element manufactured by the composition for forming a heating element can be significantly, reduced even when the composition is left at room temperature for a long time. Each of the first heating element and the second heating element may be a sheet-shaped heating element the same as the heating element manufactured in Evaluation Example 1.

A heating element according to an embodiment includes a dried and sintered product of the above-described composition for forming a heating element. The dried and sintered product of the composition for forming a heating element is a product obtained by drying the composition to remove the solvent and sintering the dried composition at a temperature of about 400° C. to about 1200° C.

The dried and sintered product of the composition for a heating element may be prepared as follows.

First, the composition for forming a heating element is applied onto a substrate using any suitable application method. Examples of the application method of the composition for forming a heating element may include, but are not limited to, screen printing, ink jet printing, dip coating, spin coating, and spray coating. For example, the composition for forming a heating element may be applied onto the substrate by spray coating. In this case, the injection speed of the composition for forming a heating element can be controlled in a range of about 10 to about 500 milliliters per minute (mL/min). Further, the distance between the composition for forming a heating element and the substrate for injection may be about 0.1 meters (m) to about 1 m, specifically about 0.2 m to about 0.9 m, and more particularly, about 0.3 m to about 0.8 m. When applying the composition for forming a heating element, the injection amount of the composition for forming a heating element may be adjusted and the application of the composition may be repetitively performed several times such that the heating element finally obtained by evaporating the solvent through subsequent heat treatment has a predetermined thickness.

Next, the substrate coated with the composition for forming a heating element is heat-treated to evaporate the solvent contained in the composition and cure the composition, so as to obtain a heating element. The heat treatment may be performed in a temperature range of about 300° C. to about 1200° C. For example, first, the substrate coated with the composition may be dried at a temperature of about 300° C. to about 1200° C. to remove a solvent, and the dried product may be heat-treated at a temperature of about 500° C. to about 900° C. for a time of about 1 minute to about 20 minutes. The heat treatment temperature of the substrate can be changed in consideration of, e.g., depending on, the material of the substrate, the kind of the matrix particle, and the coating thickness of the composition. The heat treatment step may be performed using, for example, a hot plate, but is not limited thereto.

The heating element may have various shapes, for example, may be a sheet-shaped heating element. A heating device may include the heating element.

Figure 9:
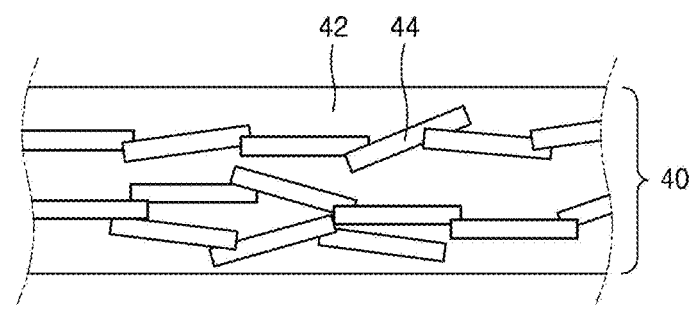
FIG. 9 is a schematic enlarged cross-sectional view of a heating element according to an embodiment.

Referring to FIG. 9, a heating element 40 may include a matrix material 42 and a plurality of nanosheet fillers 44. When manufacturing the heating element 40, glass frits forming a matrix and the nanosheet fillers 44 capable of generating heat may be mixed to form a composite. In this case, the nanosheet fillers 44 should desirably be connected to each other to generate heat through electricity. In the case of a heating element using a known ceramic material as filler, the fillers may be in the form of a spherical or polyhedral three-dimensional structure. For example, spherical or polyhedral $RuO_2$ particles may be used as fillers. When such $RuO_2$ particles are used, theoretically, the entire surface of glass frit particles are desirably covered with the $RuO_2$ particles, so that percolation between the $RuO_2$ particles may occur, and thus heat generation may occur stably. However, when spherical or polyhedral $RuO_2$ particles are used as fillers, the contact surface between $RuO_2$ may be small, so that high temperature may be required for sintering, and the content of $RuO_2$ for a desirable level of, percolation may be increased. In contrast, when the heating element 40 including the nanosheet fillers 44 is used, percolation may occur relatively easily and the sintering temperature may be lowered, compared to when known fillers are used. The surface of the matrix material 42 may be covered with a small amount of the nanosheet fillers 44, and the adjacent nanosheet fillers 44 surface-contact each other to improve sinterability. Due to such characteristics, when the $RuO_2$ nanosheet fillers 44 are used, electrical conductivity can be higher at the same content, compared to when known $RuO_2$ particles are used as fillers. The matrix material 42 and the plurality of nanosheet fillers 44 may be mixed to form the heating element 40 of a single layer. The heating element 40 may be further provided thereon with an upper layer (not shown), and the upper layer (not shown) may be a single layer or may include a plurality of layers.

A method of preparing a composition for forming a heating element according to an embodiment includes the steps of: preparing a first solution of pH of about 11 or more including composite fillers and a solvent; adding an acid to the first solution to prepare a second solution of pH of about 5 to about 9; and adding matrix particles and a binder to the second solution and mixing them to prepare a composition for forming a heating element. The composite filler includes: a core; and a coating layer disposed on the core. The core includes a nanosheet filler.

Since the first solution includes the composite filler including a nanosheet filler and a coating layer disposed on the nanosheet filler, the composite fillers can be stably dispersed even when the first solution of pH of about 11 or more is changed to the second solution of pH of about 5 to about 9 by the addition of an acid. Further, since the second solution is neutral, the elution of metal ions from matrix particles is suppressed even when matrix particles are added, thereby minimizing or preventing the deterioration of physical properties of a heating element due to the elution of metal ions. The pH of the second solution may be about 5 to about 9, about 5 to about 8.5, about 5.5 to about 8.5, about 5.5 to about 8, about 6 to about 8, about 6.5 to about 8, or about 6.5 to about 7.5. Within this pH range, the dispersion stability of the composition for forming a heating element can be further improved. The pH of the first solution may be about 11 or more, about 11.5 or more, about 12 or more, about 12.5 or more, about 13 or more, or about 13.5 or more.

The step of preparing the first solution may include a step of adding one or more polymers to an alkaline solution having a pH of about 11 or more containing the nanosheet fillers and mixing them. The composite filler may be prepared by adding a polymer to an alkali solution including a nanosheet filler to coat a part or whole of the surface of the nanosheet filler with the polymer. One or more polymer may be used, and may be added simultaneously or sequentially. For example, a first polymer is added to the alkali solution including the nanosheet filler and the solution is stirred to form a first polymer layer on the nanosheet filler, and then a second polymer is added and stirred to form a second polymer layer on the first polymer layer, so as to form a double polymer layer. When a single polymer layer or a double polymer layer is formed on the nanosheet filler, the dispersion stability of the nanosheet fillers can be remarkably improved, and the nanosheet fillers can be stably dispersed without being precipitated even when the pH of the solution is changed to neutral.

The matrix particle may be an ionically charged matrix particle further including a coating layer disposed on the surface thereof and ionically charged to have a positive charge or a negative charge. Details of the matrix particle are the same as those of the aforementioned composition for forming a heating element.

One or more embodiments of the present disclosure will now be described in detail with reference to the following examples. However, these examples are only for illustrative purposes and are not intended to limit the scope of the one or more embodiments of the present disclosure.

Preparation of Composition for Forming Heating Element

Example 1: Silane Modified FMG 5 μm+RuO$_2$/PEI/P123 (1:1:1), pH 8.2 a) Preparation of Basic Aqueous Solution Containing RuO$_2$ Nanosheet

An RuO$_2$ nanosheet was prepared as a nanosheet filler.

In order to prepare the RuO$_2$ nanosheet, K$_2$CO$_3$ and RuO$_2$ were mixed at a molar ratio of 5:8 to make a pellet, the pellet was put into an alumina crucible, and was heat-treated in a tube furnace at 850° C. for 12 hours under a nitrogen atmosphere. The weight of the pellet was 1 gram (g) to 20 g. The weight of the pellet may vary depending on required conditions. The pellet had a disk shape. After the heat treatment, when the furnace was cooled to room temperature, the alumina crucible was taken out from the furnace, and the pellet was taken out from the alumina crucible and pulverized to make a powder. Then, the powder was washed with about 4 liters (L) of water for 24 hours and then filtered to obtain a powder. The composition of the obtained powder was K$_{0.2}$RuO$_{2.1}$·nH$_2$O.

The obtained K$_{0.2}$RuO$_{2.1}$·nH$_2$O powder was introduced into a 1 molar (M) HCl solution, stirred for 3 days, and filtered to obtain a powder. The composition of the filtered powder was H$_{0.2}$RuO$_{2.1}$.

Subsequently, 1 g of the H$_{0.2}$RuO$_{2.1}$ powder was introduced into 250 milliliters (mL) of an aqueous solution containing 1 to 5 g of tetrabutylammonium hydroxide (TBAOH) as a dispersion stabilizer, and stirred for 10 days or more. After the stirring was completed, the obtained solution was centrifuged. Through the centrifugation, an aqueous solution including exfoliated RuO$_2$ nanosheets and a precipitate including non-exfoliated powder were separated. The centrifugation was carried out at a rotation speed of 2000 revolutions per minute (rpm) for 30 minutes.

The concentration of RuO$_2$ nanosheets in the aqueous solution including exfoliated RuO$_2$ nanosheets, obtained by the centrifugation, was measured using an ultraviolet-visible spectrophotometer (LVS).

The aqueous solution including 1 g of the RuO$_2$ nanosheets dispersed by 1.31 g of tetrabutylammonium hydroxide (TBAOH) was a basic aqueous solution of pH 12 or more.

b) Preparation of Silane-Coated Glass Frit 10 g of 3-aminopropyl triethoxy silane was added to 30 mL of an aqueous HCl solution of pH 1 to 3 and dissolved in the aqueous HCl solution. Then, 50 g of glass frits (enamel frit, FMG, manufactured by Hae Kwang Enamel Industrial Co., Ltd.) having an average particle diameter (D50) of 5 μm were added, stirred for 24 hours, and then filtered and dried to obtain a modified glass frit including a coating layer containing metal ions formed on the surface thereof. 3-Aminopropyl triethoxy silane is hydrolyzed on the surface of the glass frit to form an —O—Si— bond on the surface of the glass frit, and the amino group forms an ammonium ion (—NH$_3^+$), so that the surface of the glass frit may be ionically charged with a positive charge.

c) Preparation of Composition for Forming Heating Element

Branched polyethylene amine (branched PEI) (branched, 408719, manufactured by Sigma-Aldrich Corporation), which is a first polymer, and polyethylene oxide-b-polypropylene oxide-b-polyethylene oxide (Pluronic P123, manufactured by Sigma-Aldrich Corporation), which is a second polymer, were sequentially added to the basic aqueous solution including 1.31 g of TBAOH and 0.5 g of RuO$_2$ nanosheets, prepared in a), at a weight ratio of RuO$_2$:first polymer:second polymer=1:1:1, and simultaneously stirred for 24 hours, so as to obtain a first solution including a composite filler having a core-coating layer structure in which the surface of the RuO$_2$ nanosheet is coated with a first polymer layer and the first polymer layer is coated with a second polymer layer (that is, the surface of the RuO$_2$ nanosheet is coated with polymer bilayer). The first solution was a basic aqueous solution of pH 12 or more. Then, the first solution was titrated with diluted hydrochloric acid (diluted HCl) to obtain a neutral second solution of pH 8.2. Then, 8.93 g of the silane-coated glass frit prepared in b) and 0.28 g of an aqueous binder (Methocell 311, Dow Chemical, Hydroxypropyl Methylcellulose (HPMC) thickener) were added to the second solution, and stirred for 30 minutes, so as to prepare 80.24 g of a composition for forming a heating element.

The content of RuO$_2$ nanosheet was 2 vol % of the total volume of RuO$_2$ nanosheet and glass frit.

Example 2: Silane-Modified FMG 5 μm+RuO$_2$/PEI/P123 (1:1:1), pH 7.0

A composition for forming a heating element was prepared in the same manner as in Example 1, except that the pH of the second solution was adjusted to 7.

Example 3: Silane-Modified FMG 15 μm+RuO$_2$/PEI/P123 (1:1:1), pH 7.0

A composition for forming a heating element was prepared in the same manner as in Example 1, except that the pH of the second solution was adjusted to 7 and the average particle diameter (D50) of silane-coated glass frits was changed to 15 μm.

Example 4: Bare FMG 5 μm+RuO$_2$/PEI/P123(1:1:1), pH 7.0

A composition for forming a heating element was prepared in the same manner as in Example 1, except that the pH of the second solution was adjusted to 7 and glass frit not coated with silane (enamel frit, manufactured by Hae Kwang Enamel Industrial Co., Ltd.) having an average particle diameter (D50) of 5 μm was used.

Example 5: Silane-Modified FMG 5 μm+RuO$_2$/PEI (1:1), pH 7.0

Polyethylene amine (PEI) (P3143, manufactured by Sigma-Aldrich Corporation), which is a first polymer, was added to the basic aqueous solution including 1.31 g of TBAOH and 0.5 g of RuO$_2$ nanosheets, prepared in a), at a weight ratio of RuO$_2$:first polymer=1:1, and simultaneously stirred for 24 hours, so as to obtain a first solution including a composite filler having a core-coating layer structure in which the surface of the RuO$_2$ nanosheet is coated with a first polymer layer and the first polymer layer is coated with a second polymer layer (that is, the surface of the RuO$_2$ nanosheet is coated with polymer bilayer). The first solution was a basic aqueous solution of pH 12 or more. Then, the first solution was titrated with diluted hydrochloric acid (diluted HCl) to obtain a neutral second solution of pH 7.0. Then, 8.93 g of the silane-coated glass frit prepared in b) and 0.28 g of an aqueous binder (Methocell 311, Dow Chemical, Hydroxypropyl Methylcellulose (HPMC) thickener) were added to the second solution, and stirred for 30 minutes, so as to prepare 80.24 g of a composition for forming a heating element.

Comparative Example 1: Bare FMG 5 μm+RuO$_2$, pH 12.0

8.93 g of glass frits (enamel frit, manufactured by Hae Kwang Enamel Industrial Co., Ltd.) having an average particle diameter (D50) of 5 μm and 0.28 g of an aqueous binder (Methocell 311, Dow Chemical, Hydroxypropyl Methylcellulose (HPMC) thickener) were added to the basic aqueous solution including 1.31 g of TBAOH and 0.5 g of RuO$_2$ nanosheets, prepared in a), and mixed with each other, so as to 80.24 g of a composition for forming a heating element. The composition for forming a heating element had a pH of 12 or more.

Figure 8:
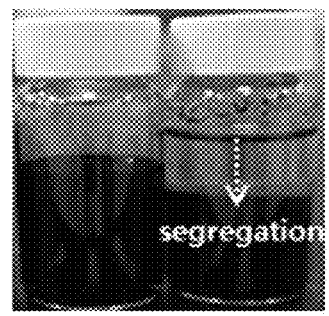
FIG. 8 is a photograph showing an image of the composition for a heating element of Comparative Example 1 before the addition of acid (left vial) and after the addition of acid (right vial)

As shown in FIG. 8, when diluted hydrochloric acid (diluted HCl) was added to the composition for forming a heating element, having a pH of 12 or more, (left vial of FIG. 8), RuO$_2$ nanosheets were precipitated, and thus segregation occurred (right vial of FIG. 8).

Comparative Example 2: Bare FMG 5 μm+RuO$_2$/PEI(1:1), pH 12.0

Polyethylene amine (PEI) (P3143, manufactured by Sigma-Aldrich Corporation), which is a first polymer, was added to the basic aqueous solution including 1.31 g of TBAOH and 0.5 g of RuO$_2$ nanosheets, prepared in a), at a weight ratio of RuO$_2$:first polymer=1:1, and stirred for 24 hours, so as to obtain a first solution including a composite filler having a core-coating layer structure in which the surface of the RuO$_2$ nanosheet is coated with a first polymer layer. The first solution was a basic aqueous solution of pH 12 or more. Then, 8.93 g of glass frits (enamel frit, manufactured by Hae Kwang Enamel Industrial Co., Ltd.) having an average particle diameter (D50) of 5 μm and 0.28 g of an aqueous binder (Methocell 311, Dow Chemical, Hydroxypropyl Methylcellulose (HPMC) thickener) were added to the first solution, and stirred for 30 minutes, so as to prepare 80.24 g of a composition for forming a heating element. The composition for forming a heating element had a pH of 12 or more.

Comparative Example 3: Silane-Modified FMG 5 μm+RuO$_2$/PEI(1:1), pH 12.0

Polyethylene amine (PEI) (P3143, manufactured by Sigma-Aldrich Corporation), which is a first polymer, was added to the basic aqueous solution including 1.31 g of TBAOH and 0.5 g of RuO$_2$ nanosheets, prepared in a), at a weight ratio of RuO$_2$:first polymer=1:1, and stirred for 24 hours, so as to obtain a first solution including a composite filler having a core-coating layer structure in which the surface of the RuO$_2$ nanosheet is coated with a first polymer layer. The first solution was a basic aqueous solution of pH 12 or more. Then, 8.93 g of the silane-coated glass frits prepared in b) and 0.28 g of an aqueous binder (Methocell 311, Dow Chemical, Hydroxypropyl Methylcellulose (HPMC) thickener) were added to the first solution, and stirred for 30 minutes, so as to prepare 80.24 g of a composition for forming a heating element. The composition for forming a heating element had a pH of 12 or more.

Comparative Example 4: Silane-Modified FMG 5 μm+RuO$_2$/PEI/P123(1:1:1), pH 12.0

Polyethylene amine (PEI) (P3143, manufactured by Sigma-Aldrich Corporation), which is a first polymer, and polyethylene oxide-b-polypropylene oxide-b-polyethylene oxide (Pluronic P123, manufactured by Sigma-Aldrich Corporation), which is a second polymer, were sequentially added to the basic aqueous solution including 1.31 g of TBAOH and 0.5 g of RuO$_2$ nanosheets, prepared in a), at a weight ratio of RuO$_2$:first polymer:second polymer=1:1:1, and simultaneously stirred for 24 hours, so as to obtain a first solution including a composite filler having a core-coating layer structure in which the surface of the RuO$_2$ nanosheet is coated with a first polymer layer and the first polymer layer is coated with a second polymer layer (that is, the surface of the RuO$_2$ nanosheet is coated with polymer bilayer). The first solution was a basic aqueous solution of pH 12 or more.

Then, 8.93 g of the silane-coated glass frit prepared in b) and 0.28 g of an aqueous binder (Methocell 311, Dow Chemical, Hydroxypropyl Methylcellulose (HPMC) thickener) were added to the first solution, and stirred for 30 minutes, so as to prepare 80.24 g of a composition for forming a heating element. The composition for forming a heating element had a pH of 12 or more.

Evaluation of Stability Over Time of Composition for Forming Heating Element

Evaluation Example 1

The composition for forming a heating element prepared in Example 1 was left at room temperature for 6 hours, 48 hours, 72 hours, and 100 hours, and then heating elements were manufactured using this composition. Then, electrical conductivity of each of the manufactured heating elements was measured, thereby evaluating the stability over time of the composition for forming a heating element. The manufacturing of the heating elements and the measurement of electrical conductivity thereof were carried out by the following method. The stability over time of each of the compositions for forming a heating element, prepared in Examples 2 to 5 and Comparative Examples 1 to 4, was evaluated in the same manner.

Electrodes were formed on an enamel substrate to be spaced apart from each other, and then the composition for forming a heating element was sprayed between the electrodes, dried in an oven at 120° C. for 10 minutes, and then heat-treated at 800° C. for 16 minutes to manufacture a heating element. The resistance between the electrodes was measured, and the width, length and thickness of the heating element having a square plate shape were measured, so as to measure the electrical conductivity of the heating element. The measurement results thereof are shown in Table 4 and FIGS. 2A and 2B.

The relative electrical conductivity of the heating element after 48 hours is calculated from the following equation (1).

Relative electrical conductivity of heating element after 48 hours (%)=[electrical conductivity of heating element made from composition having elapsed 48 hours at room temperature after preparation/electrical conductivity of heating element made from composition immediately after preparation]×100   (1)

TABLE 4

|  | Composition pH | Relative electrical conductivity of heating element after 48 hours [%] |
|---|---|---|
| Example 1 | 8.2 | 72 |
| Example 2 | 7 | 86 |
| Example 3 | 7 | 98.9 |
| Example 4 | 7 | 65 |
| Example 5 | 7 | 35 |
| Comparative Example 1 | 12 | Heating element cannot be manufactured due to precipitation of $RuO_2$ nanosheets |
| Comparative Example 2 | 12 | Less than 1 |
| Comparative Example 3 | 12 | 22 |
| Comparative Example 4 | 12 | 40 |

Figure 2A:
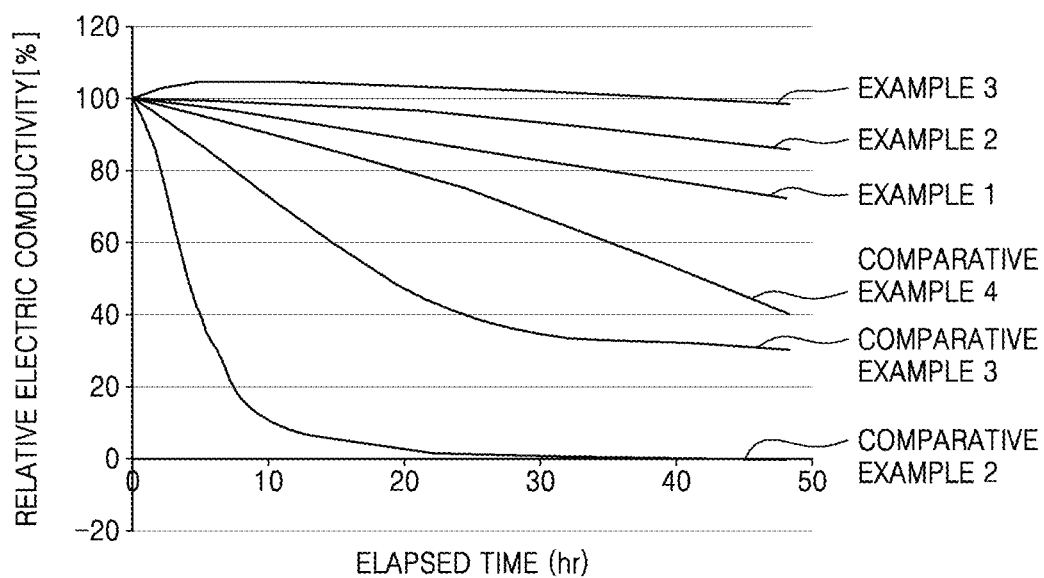
FIG. 2A is a graph showing the changes over time in electrical conductivity of heating elements manufactured using compositions for a heating element prepared in Examples 1 to 3 and Comparative Examples 2 to 4.

As shown in Table 4 and FIG. 2A, it was found that, in the compositions for forming a heating element of Examples 1 to 5, the electrical conductivity of the heating element manufactured using the composition having elapsed 48 hours after preparation, e.g., the composition that has been left at room temperature for 48 hours after preparation thereof, was maintained at 70% or more of the electrical conductivity of the heating element manufactured using the composition immediately after preparation. In contrast, it was found that, in the compositions for forming a heating element of Comparative Examples 1 to 4, fillers were precipitated after 48 hours, or the electrical conductivity of the heating element manufactured using the composition having elapsed 48 hours after preparation was 40% or less of the electrical conductivity of the heating element manufactured using the composition immediately after preparation. Therefore, the stability over time of the compositions for forming a heating element of Examples was remarkably improved compared to the stability over time of the compositions for forming a heating element of Comparative Examples.

Figure 2B:
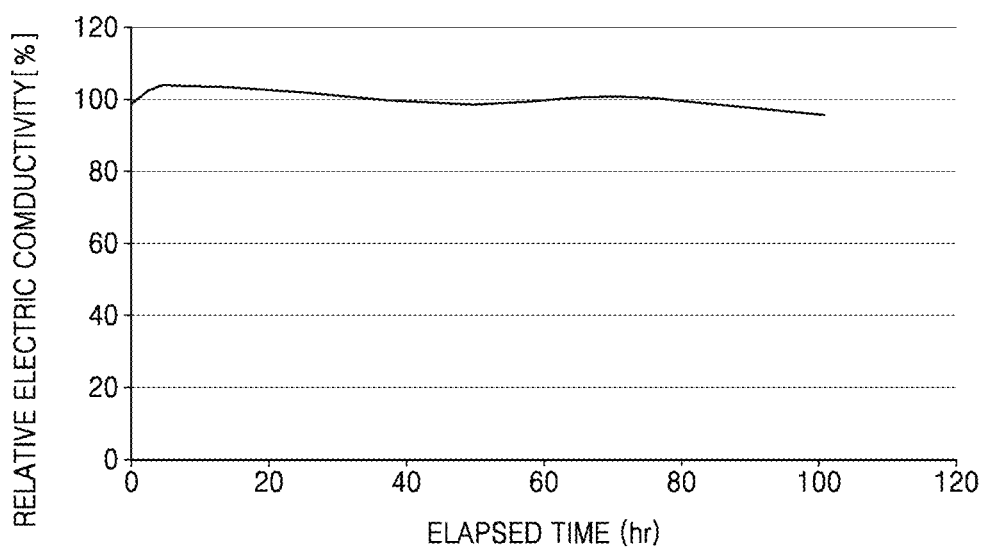
FIG. 2B is a graph showing the change over time in electrical conductivity of a heating element manufactured using the composition for a heating element prepared in Example 3.

Further, as shown in FIG. 2B, it was found that, in the composition for forming a heating element of Example 3, the electrical conductivity of the heating element manufactured using the composition having elapsed 100 hours at room temperature after preparation was maintained at 95% or more relative to the electrical conductivity of the heating element manufactured using the composition immediately after preparation.

Figure 3:
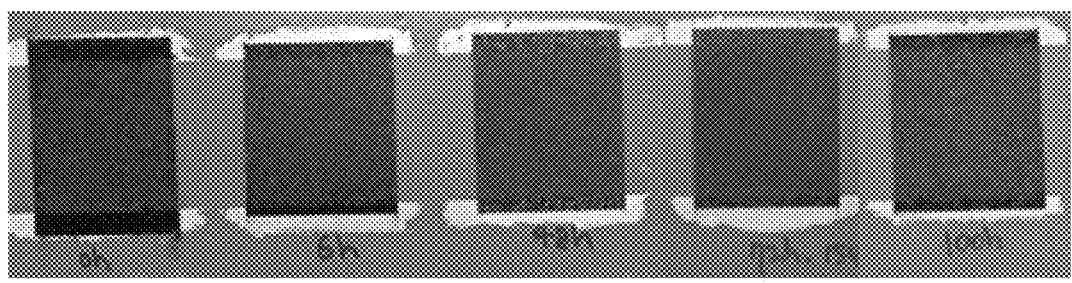
FIG. 3 is a photograph showing states, e.g., conditions, over time of a film of a heating element manufactured using the composition for a heating element prepared in Example 3.

Further, as shown in FIG. 3, it was found that, in the composition for forming a heating element of Example 3, the film state of the heating element manufactured using the composition having elapsed 100 hours at room temperature after preparation was similar to that of the heating element manufactured using the composition immediately after preparation. That is, in the heating element, $RuO_2$ nanosheets were homogeneously distributed throughout the film.

Figure 4:
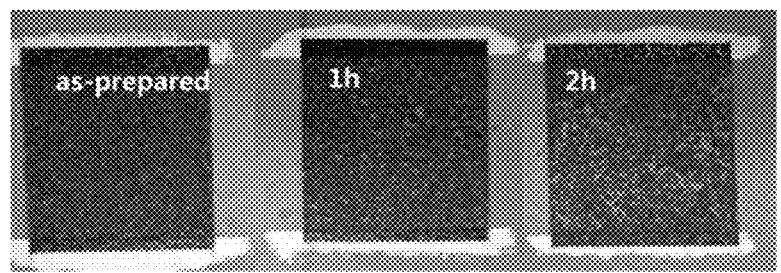
FIG. 4 is a photograph showing states over time of a film of a heating element manufactured using the composition for a heating element prepared in Comparative Example 2.

In contrast, as shown in FIG. 4, it was found that, in the composition for forming a heating element of Comparative Example 2, the film state of the heating element manufactured using the composition having elapsed 2 hours at room temperature after preparation was unevenly deteriorated compared to that of the heating element manufactured using the composition immediately after preparation. That is, in the heating element, the aggregation of $RuO_2$ nanosheets occurred, and thus a large number of transparent regions in which no $RuO_2$ nanosheets exist were formed. In the heating element, $RuO_2$ nanosheets were heterogeneously distributed throughout the film.

Evaluation of Stability Over Time of Glass Frit in Neutral Aqueous Solution and Alkaline Aqueous Solution Evaluation Example 2

Glass frits the same as the glass frits used in Comparative Example 1 were added to a neutral aqueous solution of pH 7 and an alkaline aqueous solution of pH 12, respectively, and then the change over time was observed.

Figure 5:
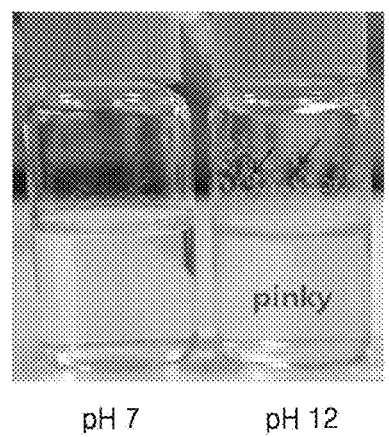
FIG. 5 is a photograph showing an image taken 1 hour after the addition of the same glass frit as that used in Comparative Example 1 to a neutral aqueous solution of pH 7 and an alkaline aqueous solution of pH 12, respectively. Here, the left vial is filled with the neutral aqueous solution of pH 7, and the right vial is filled with the alkaline aqueous solution of pH 12.

As shown in FIG. 5, the glass frits were stable in the neutral aqueous solution of pH 7, but, in the alkaline aqueous solution of pH 12, metal ions contained in the glass frits were eluted, and thus the color of the alkaline aqueous solution was converted into a pink color.

Further, as the result of analyzing the pink alkaline aqueous solution of pH 12 in which metal ions were eluted, it was found that, in the alkaline aqueous solution, 4.3 wt % or more of Na, 30 wt % or more of Ba, and 1.8 wt % or more of Si, contained in the glass frits, were eluted as $Na^+$ ions in an amount of 150 parts per million (ppm), $Ba^{2+}$ ions in an amount of 10000 ppm, and $Si^+$ ions in an amount of 170 ppm.

Figure 6A:
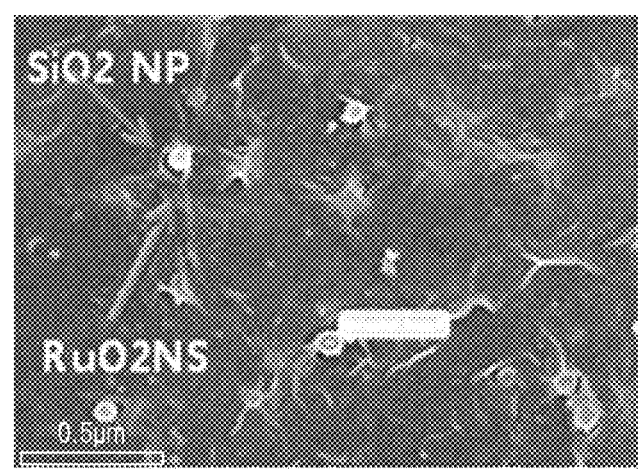
FIG. 6A is a scanning electron microscopy (SEM) image of a heating element manufactured using the composition for a heating element prepared in Comparative Example 2 after 48 hours.
Figure 6B:
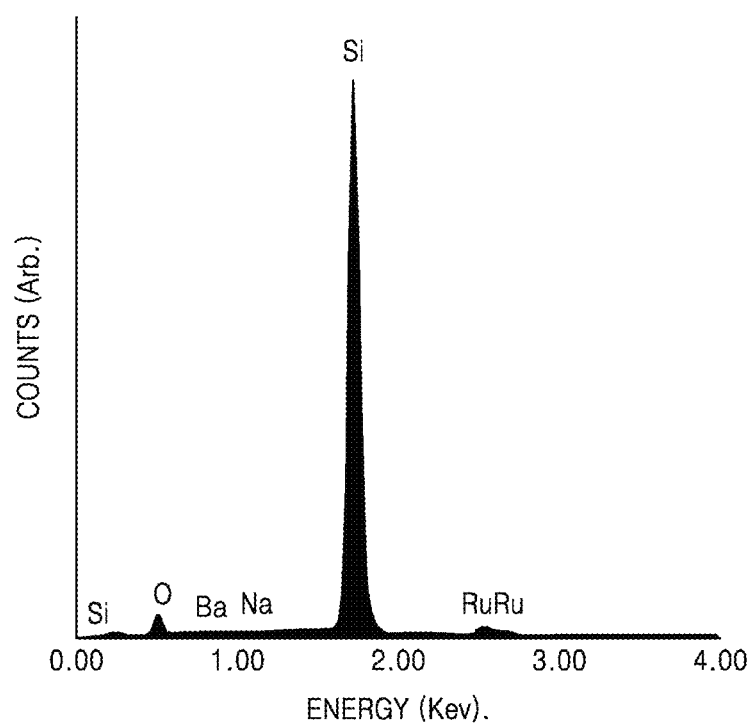
FIG. 6B is a graph showing electron dispersive spectroscopy (EDS) of a heating element manufactured using the composition for a heating element prepared in Comparative Example 2, wherein the heating element is manufactured using the composition after 48 hours from a time the composition is prepared.

Further, as the result of analyzing the SEM image of the heating element manufactured using the composition for forming a heating element of Comparative Example 2 having elapsed 48 hours after preparation, as shown in FIG. 6A, it was found that an insulating oxide such as $SiO_2$ in the form of a nanoparticle (NP) was formed on the surface of the $RuO_2$ nanosheet (NS). Therefore, the electrical conductivity of the heating element was deteriorated. Further, as the result of measuring the EDS spectrum of the heating element shown in FIG. 6B, as shown in FIG. 5B, it was found that the content of Si was high, and thus an insulating oxide such as $SiO_2$ was formed on the surface of the $RuO_2$ nanosheet.

Figure 7:
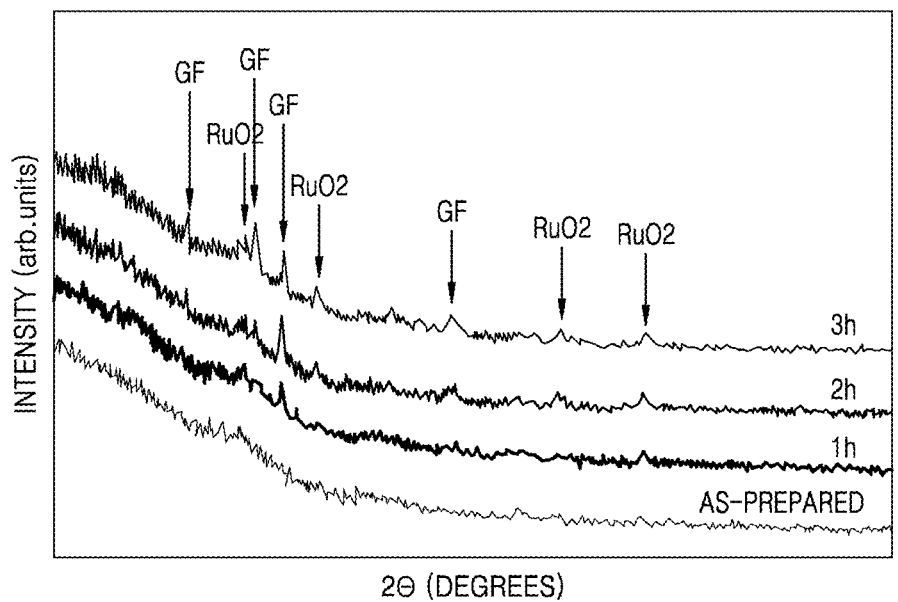
FIG. 7 is a graph showing X-ray diffraction (XRD) spectra of a heating element manufactured using the composition for a heating element prepared in Comparative Example 2 immediately after a preparation of the composition using the same after 1 hour from a time the composition is prepared, using the same after 2 hours from a time the composition is prepared, and using the same after 3 hours from a time the composition is prepared.

Further, the XRD spectra of the heating elements manufactured using the compositions for forming a heating element of Comparative Example 2 having elapsed 1 hour, 2 hours, and 3 hours after preparation were measured, and the results thereof are shown in FIG. 7.

As shown in FIG. 7, it was found that metal ions are eluted from glass frits after 3 hours, and thus the glass frits are crystallized at the time of sintering, a large number of metal oxide crystal phases exist in addition to amorphous glass matrix. As a result, it was found that the sinterability of the composition for forming a heating element was deteriorated.

Therefore, since the composition for forming a heating element has a neutral pH, the deterioration in electrical conductivity and sinterability of the heating element due to the elution of metal ions from the glass frits can be minimized or prevented.

It should be understood that example embodiments described herein should be considered in a descriptive sense only and not for purposes of limitation. Descriptions of features or aspects within each example embodiment should typically be considered as available for other similar features or aspects in other example embodiments.

While one or more example embodiments have been described with reference to the figures, it will be understood by those of ordinary skill in the art that various changes in form and details may be made therein without departing from the spirit and scope as defined by the following claims.

What is claimed is:

1. A composition for forming a heating element, comprising:
a matrix particle and an ionically charged coating layer disposed on a surface of the matrix particle;
a composite filler; and
a solvent,
wherein the composite filler comprises a core and a coating layer disposed on the core,
the core comprises a nanosheet filler, and
the composition has a pH in a range of about 5 to about 9, and
wherein the coating layer disposed on the core has a bilayer structure comprising a first polymer layer disposed on the nanosheet filler and a second polymer layer disposed on the first polymer layer.

2. The composition of claim 1, wherein the coating layer disposed on the core is a polymer layer comprising one or more polymers.

3. The composition of claim 1, wherein the coating layer disposed on the core comprises a polymer having a positive charge or a negative charge.

4. The composition of claim 1, wherein the coating layer disposed on the core comprises an amphiphilic polymer.

5. The composition of claim 1, wherein the coating layer disposed on the core comprises polyethyleneimine, polyethylene oxide-block-polypropylene oxide-block-polyethylene oxide, polyvinylamine, polyethylene oxide-block-polyacrylic acid, polyethylene oxide-block-polymethacrylic acid, polyethylene oxide-block-polyethyleneimine, polyethylene oxide-block-polyaspartic acid, polydimethylaminoethyl methacrylate-block-polydihydropropyl methacrylate, polyacrylic acid-block-polyacrylamide, polyacrylic acid-block-polyhydroxyethyl acrylate, polyethyleneamine, polyethylene oxide, polyethylene glycol, polyethylene sulfone, or a combination thereof.

6. The composition of claim 1, wherein the coating layer disposed on the core comprises a first polymer and a second polymer, and a weight ratio of the first polymer to the second polymer is in a range of about 10:90 to about 90:10.

7. The composition of claim 1, wherein an amount of a polymer present in the coating layer disposed on the core is in a range of about 10 parts by weight to about 500 parts by weight, based on 100 parts by weight of the nanosheet filler.

8. The composition of claim 1, wherein the nanosheet filler comprises an oxide, a boride, a carbide, a chalcogenide, or a combination thereof.

9. The composition of claim 1, wherein the nanosheet filler comprises $RuO_2$, $MnO_2$, $ReO_2$, $VO_2$, $OsO_2$, $TaO_2$, $IrO_2$, $NbO_2$, $WO_2$, $GaO_2$, $MoO_2$, $InO_2$, $CrO_2$, $RhO_2$, $Ta_3B_4$, $Nb_3B_4$, $TaB$, $NbB$, $V_3B_4$, $Dy_2C$, $Ho_2C$, $AuTe_2$, $PdTe_2$, $PtTe_2$, $YTe_3$, $CuTe_2$, $NiTe_2$, $IrTe_2$, $PrTe_3$, $NdTe_3$, $SmTe_3$, $GdTe_3$, $TbTe_3$, $DyTe_3$, $HoTe_3$, $ErTe_3$, $CeTe_3$, $LaTe_3$, $TiSe_2$, $TiTe_2$, $ZrTe_2$, $HfTe_2$, $TaSe_2$, $TaTe_2$, $TiS_2$, $NbS_2$, $TaS_2$, $Hf_3Te_2$, $VSe_2$, $VTe_2$, $NbTe_2$, $LaTe_2$, $CeTe_2$, or a combination thereof.

10. The composition of claim 1, wherein the nanosheet filler has a thickness in a range of about 1 nanometer to about 1,000 nanometers and a length in a range of about 0.1 micrometers to about 500 micrometers.

11. The composition of claim 1, wherein the nanosheet filler is present in an amount of about 20 volume percent or less, based on a total volume of the matrix particle and the nanosheet filler.

12. The composition of claim 1, wherein the nanosheet filler has an electrical conductivity of about 1000 siemens per meter or greater.

13. The composition of claim 1, wherein dispersibility of the composite filler is independent of the pH of the composition.

14. The composition of claim 1, wherein the matrix particle comprises a glass frit.

15. The composition of claim 14, wherein the glass frit comprises silicon oxide, lithium oxide, nickel oxide, cobalt oxide, boron oxide, potassium oxide, aluminum oxide, titanium oxide, manganese oxide, copper oxide, zirconium oxide, phosphorus oxide, zinc oxide, bismuth oxide, lead oxide, sodium oxide, or a combination thereof.

16. The composition of claim 15, wherein the glass frit comprises an additive and a silicon oxide, and
the additive comprises Li, Ni, Co, B, K, Al, Ti, Mn, Cu, Zr, P, Zn, Bi, Pb, Na, or a combination thereof.

17. The composition of claim 14, wherein the glass frit comprises a zinc oxide-silicon oxide glass frit, a zinc oxide-boron oxide-silicon oxide glass frit, a zinc oxide-boron oxide-silicon oxide-aluminum oxide glass frit, a bismuth oxide-silicon oxide glass frit, a bismuth oxide-boron oxide-silicon oxide glass frit, a bismuth oxide-boron oxide-silicon oxide-aluminum oxide glass frit, a bismuth oxide-zinc oxide-boron oxide-silicon oxide glass frit, a bismuth oxide-zinc oxide-boron oxide-silicon oxide-aluminum oxide glass frit, or a combination thereof.

18. The composition of claim 1, wherein the matrix particle has a particle diameter in a range of about 1 micrometer to about 50 micrometers.

19. The composition of claim 1, wherein the ionically charged coating layer disposed on the surface of the matrix particle comprises a hydrolysate of an organosilane, an amphiphilic polymer, or a combination thereof.

20. The composition of claim 19, wherein the organosilane comprises N-2-(aminoethyl)-3-aminopropylmethyldimethoxysilane, N-2-(aminoethyl)-3-aminopropyltrimethoxysilane, 3-aminopropyltrimethoxy silane, 3-aminopropyltri ethoxysilane, N-phenyl-3-aminopropyltrimethoxysilane, or a combination thereof.

21. The composition of claim 1, further comprising:
a dispersion stabilizer, an oxidation stabilizer, a weather stabilizer, an antistatic agent, a dye, a pigment, a coupling agent, or a combination thereof.

22. The composition of claim 21, wherein the dispersion stabilizer comprises tetrabutyl ammonium hydroxide, tetramethyl ammonium hydroxide, or a combination thereof.

23. The composition of claim 1, further comprising:
a binder,
wherein the binder comprises a cellulose polymer, an acrylic polymer, a styrene polymer, a polyvinyl resin, a methacrylic acid ester polymer, a styrene-acrylic acid ester copolymer, a polystyrene, a polyvinyl butyral, a polyvinyl alcohol, a polyethylene oxide, a polyacrylonitrile, a polypropylene carbonate, a polymethyl methacrylate, an ammonium acrylate polymer, an arabic gum, a gelatin, an alkyd resin, a butyral resin, a saturated polyester resin, a natural rubber, a silicone rubber, a fluorosilicone, a fluoroelastomer, a synthetic rubber, a copolymer thereof, or a combination thereof.

24. A method of preparing a composition for forming a heating element, the method comprising:
preparing a first solution having a pH in a range of about 11 or greater comprising a composite filler and a solvent;
adding an acid to the first solution to prepare a second solution having a pH in a range of about 5 to about 9; and
adding a matrix particle and a binder to the second solution and mixing the matrix particle and the binder with the second solution to prepare the composition for forming the heating element,
wherein the composite filler comprises a core and a coating layer disposed on the core, and
the core comprises a nanosheet,
the coating layer disposed on the core has a bilayer structure comprising a first polymer layer disposed on the nanosheet filler and a second polymer layer disposed on the first polymer layer, and
the composition further comprises an ionically charged coating layer disposed on a surface of the matrix particle.

25. The method of claim 24, wherein the preparing of the first solution comprises adding one or more polymers to an alkaline solution having a pH of about 11 or greater and comprising a nanosheet filler, and mixing the one or more polymers with the alkaline solution.

* * * * *